United States Patent Office 3,161,643
Patented Dec. 15, 1964

3,161,643
BIS(CARBOALKOXYVINYL)DIAMINES AND DIIMINES
Lee A. Miller, Dayton, Ohio, assignor to Monsanto Company, a corporation of Delaware
No Drawing. Filed Apr. 24, 1961, Ser. No. 104,785
3 Claims. (Cl. 260—268)

The present invention relates to diamines and more particularly provides diamine compounds containing olefinic double bonds, ester linkages, and secondary and tertiary amine linkages. The invention also provides a method of preparing the new diamine compounds by the addition reaction of certain acetylenic esters and certain diamino and diimino nitrogen compounds. Further aspects of the invention are the provision of new and valuable biologically active compounds useful as biological toxicants, for example, as herbicides, fungicides, etc.

According to the invention there are provided N,N'-bis(carboalkoxyvinyl)diamine and diimine derivatives by the reaction of an alkyl propiolate ester having from 1 to 6 carbon atoms in the alkyl radical with a nitrogen compound selected from the class consisting of a hydrocarbylene diamine of the formula $$\overset{Z}{\underset{|}{HN}}-R-\overset{Z}{\underset{|}{NH}}$$

wherein R is a bivalent hydrocarbylene radical free of aliphatic unsaturation, containing from 2 to 12 carbon atoms and being attached through diverse carbon atoms thereof to the rest of the molecule of which it forms a part, and Z is selected from the class consisting of hydrogen and alkyl radicals of from 1 to 5 carbon atoms, and cyclic diimines of the formula

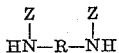

wherein D and D' are bivalent alkylene radicals having from 1 to 3 carbon atoms in the alkylene chain and a total of from 1 to 7 carbon atoms and D and D' together with the nitrogen atoms to which they are bonded complete a ring of from 5 to 6 members.

Reaction of an alkyl propiolate with the hydrocarbylene diamine or the cyclic diimine proceeds by an addition reaction involving the introduction of the carboalkoxyvinyl radical at each amine or imine nitrogen, thus:

$$\overset{Z}{\underset{|}{HN}}-R-\overset{Z}{\underset{|}{NH}} + 2R'O\overset{O}{\underset{\|}{C}}C\equiv CH \longrightarrow$$

$$R'O\overset{O}{\underset{\|}{C}}CH=CH-\overset{Z}{\underset{|}{N}}-R-\overset{Z}{\underset{|}{N}}CH=CH\overset{O}{\underset{\|}{C}}OR'$$

or

 $+ 2R'O\overset{O}{\underset{\|}{C}}C\equiv CH \longrightarrow$

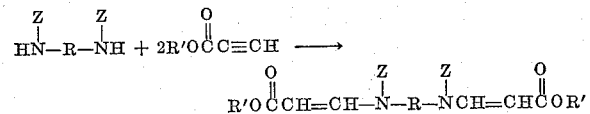

wherein R, Z, D, and D' are as defined above, and R' is an alkyl radical having from 1 to 6 carbon atoms.

Thus, from p-phenylenediamine and tert-butyl propiolate there is obtained N,N'-bis(2-carbo-tert-butoxyvinyl)-p-phenylenediamine

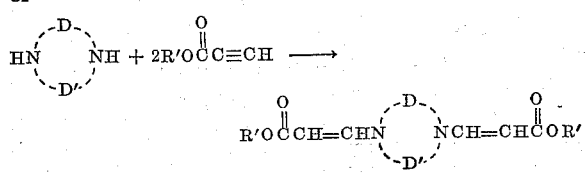

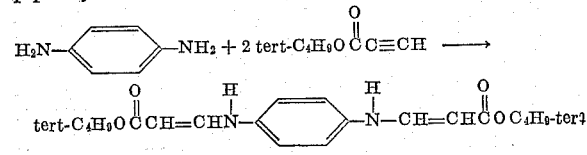

From a cyclic diimine such as piperazine reaction with ethyl propiolate gives 1,4-bis(2-carboethoxyvinyl)-piperazine

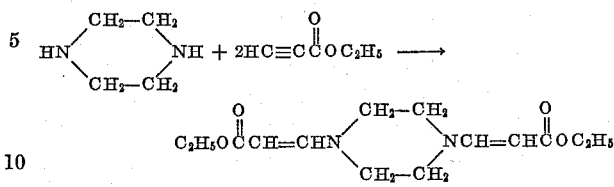

From an alkylenediamine such as pentamethylenediamine reaction with methyl propiolate gives N,N'-bis(2-carbomethoxyvinyl)pentamethylenediamine $$H_2N(CH_2)_5NH_2 + 2CH_3O\overset{O}{\underset{\|}{C}}C\equiv CH \longrightarrow$$

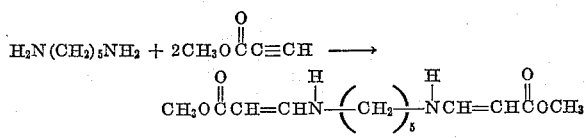

The presently useful hydrocarbylene diamines are alkylene diamines, cycloalkylene diamines, and arylene diamines. The alkylene chain or the cycloalkylene or arylene ring may or may not be substituted with 1 or more alkyl radicals so long as the total carbon content does not exceed 12 carbon atoms. Thus, from hydrocarbylene diamines and alkyl propiolates there are obtained a class of compounds generically referred to as N,N'-bis(carboalkoxyvinyl)hydrocarbylene diamines.

Examples of N,N'-bis(carboalkoxyvinyl)alkylene diamines provided by this invention by reaction of an alkyl propiolate with an alkylenediamine are:

N,N'-bis(2-carbomethoxyvinyl)ethylenediamine from methyl propiolate and ethylenediamine,
N,N'-bis(2-carboethoxyvinyl)methylethylenediamine from ethyl propiolate and 1,2-propylenediamine,
N,N'-bis(2-carbopropoxyvinyl)-1,3-propylenediamine from propyl propiolate and 1,3-propylenediamine,
N,N'-bis(2-carbobutoxyvinyl)-3-methyl-1,3-propylenediamine from butyl propiolate and 1,3-butylenediamine,
N,N'-diethyl-N,N'-bis(2-carbomethoxyvinyl)-1,4-butylenediamine from methyl propiolate and N,N'-diethyl-1,4-butylenediamine,
N,N'-bis(2-carbohexyloxyvinyl)-1,6-hexylenediamine from hexyl propiolate and 1,6-hexylenediamine,
N,N'-dimethyl-N,N'-bis(2-carboisopropoxyvinyl)-1,7-heptylenediamine from isopropyl propiolate and 1,7-heptylenediamine,
N,N'-bis(2-carbobutoxyvinyl)-1,8-octylenediamine from butyl propiolate and 1,8-octylenediamine,
N,N'-bis(2-carbopentyloxyvinyl)-1,10-decylenediamine from pentyl propiolate and 1,10-decylenediamine,
N,N'-dimethyl-N,N'-bis(2-carbomethoxyvinyl)-2,11-dodecylenediamine from methyl propiolate and N,N'-dimethyl-2,11-dodecylenediamine, and
N,N'-bis(2-carboethoxyvinyl)-1,12-dodecylenediamine from ethyl propiolate and 1,12-dodecylenediamine.

Examples of presently useful cycloalkylene diamines and the bis(2-carboalkoxyvinyl) derivatives obtained therefrom by reaction with an alkyl propiolate are the 1,2-, 1,3-, and 1,4-cyclohexanediamines which respectively yield the N,N'-bis(2-carboalkoxyvinyl)-1,2-cyclohexylenediamine, the N,N'-bis(2-carboalkoxyvinyl)-1,3-cyclohexylenediamine, or the N,N'-bis(2-carboalkoxyvinyl)-1,4-cyclohexylenediamine, e.g., N,N'-dimethyl-1,2-cyclohexanediamine which yields N,N'-dimethyl-N,N'-bis(2-carbomethoxyvinyl)-1,2-cyclohexylenediamine with methyl propiolate; 1,3-cyclopentanediamine which yields N,N'-bis(2-carboethoxyvinyl)-1,3 - cyclopentylenediamine with ethyl propiolate; [bicyclohexyl]-4,4'-diamine which yields N,N'-bis(2-carbopropoxyvinyl) - 4,4' - [bicyclohexylene] diamine with propyl propiolate; 2,5-dipropyl-1,4,-cyclohexanediamine which yields N,N'-bis(2-carboisopropoxyvinyl-2,5-dipropyl-1,4-cyclohexylenediamine with isopropyl propiolate;

Examples of presently useful arylenediamines and the bis(2-carboalkoxyvinyl) derivatives obtained therefrom by reaction with an alkyl propiolate are:

ortho-, meta- or para-phenylenediamines which yield, respectively, N,N'-bis(2-carboalkoxyvinyl)-o-phenylenediamine, N,N'-bis(2-carboalkoxyvinyl) - m - phenylenediamine, or N,N'-bis(2-carboalkoxyvinyl)-p-phenylenediamine, e.g., 2-butyl-p-phenylenediamine which yields N,N'-bis(2-carboethoxyvinyl)-2-butyl-p-phenylenediamine with ethyl propiolate; 2,2'-, 2,4'-, 3,3'-, 3,4'-, or 4,4'-biphenyldiamine which yields the N,N'-bis(2-carboalkoxyvinyl)-biphenylenediamine wherein the two carboalkoxyvinyl radicals are present at the positions which had been occupied by the two amine hydrogen atoms of the biphenyl diamines;

The 1,2-, 1,4-, 1,5-, 1,6-, 1,7-, 1,8-, 2,6- or 2,7-naphthylenediamines which yield N,N'-bis(2-carboalkoxyvinyl)naphthylenediamine wherein likewise the two carboalkoxyvinyl radicals are present at the positions which had been occupied by the two amine hydrogen atoms of the naphthylenediamines; N,N'-dialkylphenylenediamine such as N,N'-dihexyl-m-phenylenediamine which yields N,N'-dihexyl-N,N'-bis(2-carboethoxyvinyl)-m-phenylenediamine;

The N,N'-dimethylnaphthylenediamines such as N,N'-dimethyl-1,2-naphthylenediamine which yield N,N'-dimethyl - N,N' - bis(2 - carbopropoxyvinyl) - 1,2 - naphthylenediamine, etc.

The useful cyclic diimines are, e.g., the imidazolidines:

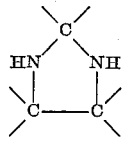

or the six membered piperazines having the structure

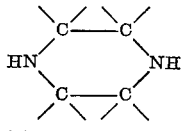

or the six membered hexahydropyrimidines

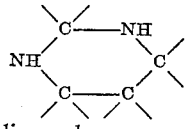

in which the dangling valences are satisfied by hydrogen or one or more alkyl radicals of such carbon chain lengths and in such quantities that the total number of carbon atoms in the alkylene radicals which are inter-positioned between two imine nitrogen groups is from 1 to 7.

Examples of the presently provided heterocyclic diimines and the bis(carboalkoxyvinyl) derivatives obtained therefrom by reaction with an alkyl propiolate are:

1,4-bis(2-carbomethoxyvinyl)piperazine from piperazine and methyl propiolate;
2,2 - dimethyl - 1,4 - bis(2 - carbopropoxyvinyl)piperazine from 2,2-dimethylpiperazine and propyl propiolate;
2,5 - diethyl - 1,4 - bis(2 - carbohexyloxyvinyl)piperazine from 2,5-diethylpiperazine and hexylpropiolate;
2 - pentyl - 1,4 - bis(2 - carbobutoxyvinyl)piperazine from 2-pentylpiperazine and butyl propiolate;
1,3-bis(2-carbomethoxyvinyl)imidazolidine from methyl propiolate and imidazolidine;
1,3 - bis(2 - carbopentoxyvinyl) - 2,4,5 - triethylimidazolidine from pentyl propiolate and 2,4,5-triethylimidazolidine;
1,3 - bis(2 - carbocyclohexyloxyvinyl) - 2,5 - dibutylhexahydropyrimidine from cyclohexyl propiolate and 2,5-dibutylhexahydropyrimidine, etc.

Reaction of the alkyl propiolate with the hydrocarbylene diamine or the cyclic diimine to give the presently provided bis(carboalkoxyvinyl)amines proceeds readily in the presence or absence of catalyst and/or diluents or solvents. The reaction proceeds according to an addition mechanism involving the bonding of the alkyl propiolate through the triple bond of the propiolate to the amino or imino nitrogen atoms of the diamine or diimine reactant and a transfer of the amino or imino hydrogen atom to the alpha carbon atom of the propiolate ester.

Reaction of the alkyl propiolate with the diamines or diimines to give the bis(carboalkoxyvinyl)amine compounds takes place at ordinary, decreased, or increased temperatures, say, at temperatures of from about −10° C. to 120° C. depending upon the nature of the diamine or diimine. In order to increase the rate of reaction, it is generally preferable to heat the reaction mixture to elevated temperatures on the order from about 50° C. to 150° C. However, in those cases wherein the reaction is exothermic, it is recommended that initial runs be started at low temperatures, for example at about −5° C. to 10° C. and that external heating be employed only if there is no evidence of reaction at below ordinary room temperatures.

A solvent or diluent, though not necessary, is also recommended. This is because it serves to dissipate and more evenly distribute the heat being applied to the reaction mixture, and irrespective of the temperature conditions, use of the solvent or diluent minimizes the tendency of side reactions to take place. Useful solvents for this purpose are the cycloalkanes, for example, cyclohexane, cyclopentane or the alkyl substituted cycloalkanes. Other solvents generally useful are for example, benzene, toluene, xylene, hexane, petroleum spirits, dichlorobenzene, ethylene dichloride, carbon tetrachloride, etc. Other useful diluents include: the ketones and ethers, for example acetone, ethyl ether, isopropyl ether, and dioxane.

Since formation of the presently provided bis(carboalkoxyvinyl)amine derivatives proceeds by reaction of 1 mole of the hydrocarbylene diamine or cyclic diimine with 2 moles of the alkyl propiolate, these reactants are advantageously employed in such stoichiometric proportions. However, an excess of either the alkyl propiolate or the diamine or diimine reactants may be used, since any unreacted material can be readily separated from the bis(carboalkoxyvinyl)diamine or diimine product.

The presently provided, bis(carboalkoxyvinyl)diamines and diimines are stable, well characterized compounds, which range from viscous liquids to crystalline solids. They are advantageously employed for a variety of industrial and agricultural purposes, for example, as hardening agents in synthetic rubber manufacturing processes; as plasticizers for vinyl polymers; as mold release agents in the plastic industries; and as toxicant compositions in preventing or inhibiting the growth of fungi and bacteria.

The present bis(carboalkoxyvinyl)diamine and diimine derivatives are also characterized by a high degree of efficacy in that they possess selective pre-emergent herbicidal activity at low concentrations. Herbicidal compositions containing the present compounds are advantageously formulated by first preparing a solution of the compound in an organic solvent and then adding the resulting solution to water containing an emulsifying agent to form an oil-in-water emulsion. Emulsifying agents which may be employed are those customarily used in the art for preparation of oil-in-water emulsions. For example, the higher alkylbenzenesulfonates, the long chained polyalkylene glycols, the long chained alkylsulfosuccinates, etc. While the present compounds are most advantageously employed as herbicides and as other biological toxicants by incorporating them into an emulsion as herein described, they may also be incorporated into solid carriers such as clay, talc, pumice or bentonite to give compositions which may be applied either to infested areas to locale which may be subjected to infestation. They may also be dissolved in liquefied gases such as the fluorochloroethanes or methyl chloride and applied from aerosol bombs containing the solution.

A representative example of compounds within the scope of this invention, 1,4-bis(2-carbomethoxyvinyl)-piperazine was found to be active as a selective pre-emergent herbicide against wild oat at a concentration of 25 pounds per acre rendering severe damage to the wild oat test plants while not affecting grass, bean and broad leaf plants.

The invention is further illustrated by, but not limited to, the following examples.

Example 1

A mixture of 16.8 g. (0.2 mole) of methyl propiolate, 19.4 g. (0.1 mole) of piperazine hydrate, 100 ml. of benzene and 1.0 ml. of 40% methanolic Triton B methoxide (trimethylbenzylammonium methoxide) was refluxed for 12 hours. No exothermic reaction was observed during the refluxing. The reaction mixture was filtered to separate a crude product melting at 193–195° C. The colorless crude product was recrystallized from 750 ml. of benzene to obtain 20 g. of colorless needles melting point 197–198° C. after drying for 8 hours at 110° C. A second recrystallization of the crystals from methanol gave a colorless solid melting at 199.0–199.5° C. which analyzed as 56.86% carbon, 6.99% hydrogen and 11.14% nitrogen as compared to 56.68% carbon, 7.14% hydrogen and 11.02% nitrogen the calculated values, for

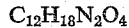

$C_{12}H_{18}N_2O_4$ which data are consistent with the compound 1,4-bis(2-carbomethoxyvinyl)piperazine.

Example 2

A mixture of 10.81 g. of p-phenylenediamine (0.1 mole), 17.65 g. of methyl propiolate (0.2 mole+5% excess), 100 ml. of benzene and 2 ml. of acetic acid was stirred in reflux for 12 hours. When the refluxing was completed the reaction mixture was filtered to obtain 9.0 g. of crude product which was washed with two 100 ml. portions of ether and dried for 1.5 hours. The product thus obtained, melting point 107–110° C., analyzed as containing 61.02% carbon and 6.44% hydrogen as compared to 60.86% carbon and 5.84% hydrogen for $C_{14}H_{16}N_2O_4$ Infrared analysis of the product gave the following results:

| Absorption— | Function indicated |
|---|---|
| 3220 cm.$^{-1}$ | NH. |
| 1675 cm.$^{-1}$ | C=O. |
| 1600, 1500 cm.$^{-1}$ | C=C aromatic. |
| 1260–1135 cm.$^{-1}$ | C—N and/or C—O ester. | which data is consistent with the compound N,N'-bis(2-carbomethoxyvinyl)-p-phenylenediamine.

Example 3

To 6 g. of ethylene diamine dissolved in 50 ml. of benzene, there was added 18.4 of methyl propiolate (10% excess) dissolved in 100 ml. of benzene at a dropwise rate over a period of 2 hours while controlling the temperature between 4–12° C. When the addition was completed, stirring of the mixture was continued for 1½ hours. The reaction mixture was then filtered to obtain 9.0 g. of N,N'-bis(2-carbomethoxyvinyl)ethylenediamine, melting point 107–109° C. Analysis of the product showed that it contained 52.78% carbon and 7.29% hydrogen as compared with 552.62% carbon and 7.07% hydrogen, the calculated values for $C_{10}H_{16}N_2O_4$.

I claim:

1. A compound of the formula

in which R is alkyl of from 1 to 6 carbon atoms, D and D' are alkylene having 1 to 3 carbon atoms in the alkylene chain and a total of from 1 to 7 carbon atoms and wherein D and D' together with the nitrogen atoms to which they are attached complete a ring of 5 to 6 members.

2. A compound of the formula

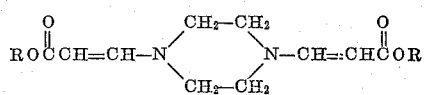

wherein R is alkyl of from 1 to 6 carbon atoms.

3. 1,4-bis(2-carbomethoxyvinyl)piperazine.

References Cited in the file of this patent

UNITED STATES PATENTS

| 2,312,082 | Dietrich | Feb. 23, 1943 |
| 2,420,122 | Chenicek | May 6, 1947 |
| 2,413,856 | Bersworth | Jan. 7, 1947 |

OTHER REFERENCES

Johnson: The Chemistry of the Acetylenic Compounds, Volume II, The Acetylenic Acids, pp. 220–221, Edward Arnold and Co., London (1950).

Gray et al.: Journal American Chemical Society, vol. 73, pp. 3577–3578 (1951).